(12) United States Patent
Maekawa et al.

(10) Patent No.: US 6,355,698 B1
(45) Date of Patent: *Mar. 12, 2002

(54) SUBSTANTIALLY ANHYDROUS FOAMING AGENT AND PROCESS FOR PRODUCING THE SAME

(75) Inventors: Tsukasa Maekawa; Nobuyuki Ueda; Sadafumi Shono; Yoshifumi Tachi; Shigeru Sumitomo, all of Tokushima (JP)

(73) Assignee: Otsuka Chemical Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,085
(22) PCT Filed: Jul. 10, 1998
(86) PCT No.: PCT/JP98/03094
 § 371 Date: Mar. 22, 2000
 § 102(e) Date: Mar. 22, 2000
(87) PCT Pub. No.: WO99/45080
 PCT Pub. Date: Sep. 10, 1999

(30) Foreign Application Priority Data

Mar. 3, 1998 (JP) .............................................. 10-50504
Mar. 3, 1998 (JP) .............................................. 10-50571
Apr. 27, 1998 (JP) ........................................... 10-116822

(51) Int. Cl.[7] .............................. C08J 9/22; C08J 9/224
(52) U.S. Cl. ............................. 521/57; 521/76; 521/78; 521/91; 521/92; 521/93; 521/95
(58) Field of Search .............................. 521/57, 76, 95, 521/78, 91, 92, 93

(56) References Cited

U.S. PATENT DOCUMENTS

| | | | |
|---|---|---|---|
| 4,293,658 A | 10/1981 | Raden et al. |
| 4,330,635 A | 5/1982 | Tokas |
| 4,390,641 A | 6/1983 | Smith |
| 4,518,716 A | 5/1985 | Lee et al. |
| 4,567,212 A | 1/1986 | Bauman et al. |

FOREIGN PATENT DOCUMENTS

| | | |
|---|---|---|
| JP | 58-196240 | 11/1983 |
| JP | 63-175040 | 7/1988 |
| JP | 4-320432 | 11/1992 |
| JP | 6-179862 | 6/1994 |
| JP | 7-11234 | 1/1995 |
| JP | 8-295872 | 11/1996 |
| WO | WO 95/25546 | 9/1995 |

OTHER PUBLICATIONS

English abstract of Japanese Publication 07011231, dated Jan. 13, 1995.

English abstract of Japanese Publication 06179862, dated Jun. 28, 1994.

*Primary Examiner*—Morton Foelak
(74) *Attorney, Agent, or Firm*—Whitham, Curtis & Christofferson, PC

(57) ABSTRACT

It provides a blowing agent which is significantly inhibited from solidification and is exceedingly useful as a blowing agent satisfactory in flowability, dispersibility into resins, and the like, even after the lapse of a prolonged period of time, and a process for producing the same. The blowing agent of the present invention is substantially anhydrous blowing agent, and it is obtained by treating a blowing agent with a surface-treating agent capable of removing water from the blowing agent, followed by optionally heating during or after the treatment.

9 Claims, No Drawings

SUBSTANTIALLY ANHYDROUS FOAMING AGENT AND PROCESS FOR PRODUCING THE SAME

TECHNICAL FIELD

The present relates to a substantially anhydrous blowing agent and a process for producing the same.

BACKGROUND ART

Blowing agents, such as azodicarbonamide, have been conventionally utilized extensively for thermoplastic resins, for example, vinyl chloride resins, polyolefin resins (polyethylene resins, polypropylene resins, and the like), ethylene vinyl alcohol resins, rubbers, and the like.

These blowing agents, which are usually finely powdered compounds, have a problem that they aggregate and are solidified with the lapse of time or under load to thereby show impaired flowability in the step of addition to resins to cause hopper clogging, or to thereby have impaired dispersibility into resins. Mitigation of this solidification is desired more and more with the recent trend toward quality improvement in foamed resins and labor saving in the production thereof.

Techniques currently employed for overcoming the above problem include (1) technique of adding inorganic powder particles, such as silica, metal silicate or the like, as a solidification inhibitor to a blowing agent, (2) technique of batchwise drying a blowing agent for a sufficient period to thereby diminish the water contained therein in a slight amount, and the like.

However, use of these techniques has various drawbacks. Namely, technique (1), although effective in solidification prevention in some degree, cannot impart the effect which lasts beyond several months. For application to a blowing agent comprising finer particles, inorganic powder particles should be added in a larger amount. However, the addition of a larger amount of the inorganic powder particles is causative of cell enlargement during foaming, and is hence undesirable in applications where fine cells are required. Technique (2), on the other hand, has significantly reduced productivity because the drying requires much time, resulting in an increased production cost. In addition, technique (2) cannot cope with continuous production. Furthermore, it is difficult to dry and remove the water contained in crystals sufficiently to thereby obtain a substantially anhydrous blowing agent. Also, effects in solidification prevention is limited.

Japanese Published Unexamined Patent Application No. 320432/92 discloses a method of adding a silane coupling agent dissolved in a solvent to azodicarbonamide to thereby improve flowability and dispersibility into resins. However, this method is ineffective in sufficiently preventing solidification.

Furthermore, Japanese Published Unexamined Patent Application No. 295872/96 discloses a method of adding an aluminum coupling agent dissolved in a solvent to a chemically blowing agent to thereby improve flowability and dispersibility into resins. However, this method is also ineffective in sufficiently preventing solidification.

DISCLOSURE OF THE INVENTION

The present inventors made intensive studies in order to eliminate the above problems. As a result, they have-found that a substantially anhydrous blowing agent is obtained by treating a blowing agent with a surface-treating agent capable of removing water from the blowing agent, and optionally by heating it. Furthermore, they found that the blowing agent thus obtained is significantly inhibited from solidification and is exceedingly useful as a blowing agent satisfactory in flowability, dispersibility into resins, and the like, even after the lapse of a prolonged period of time. The present invention has been completed based on these findings.

That is, the present invention relates to a substantially anhydrous blowing agent, especially a substantially anhydrous crystalline azodicarbonamide.

Furthermore, the present invention relates to a substantially anhydrous blowing agent obtained by treating a blowing agent with a surface-treating agent capable of removing water from the blowing agent.

Moreover, the present invention relates to a process for producing a substantially anhydrous blowing agent, which comprises treating a blowing agent with a surface-treating agent capable of removing water from the blowing agent under conditions substantially free of a solvent.

The substantially anhydrous blowing agent of the present invention has been significantly improved especially in unsusceptibility to solidification under load and in unsusceptibility to solidification with the lapse of time. Hence, the substantially anhydrous blowing agent is extremely free from solidification even through long-term storage in a stacked state, and retains for a long time the satisfactory flowability and the satisfactory dispersibility into resins which properties are possessed by the crystalline powder immediately after production.

The foaming performances of the blowing agent of the present invention are equal to those of the conventional blowing agents.

Consequently, as a result that the substantially anhydrous blowing agent of the present invention is provided, the fear that blowing agent products may be solidified under load or with the lapse of time from the production thereof to the use thereof by users is eliminated.

BEST MODE FOR CARRYING OUT THE INVENTION

The blowing agent which can be used in the present invention is selected from conventionally known blowing agents. Examples include azodicarbonamide (ADCA; decomposition temperature: about 200° C.), p,p'-oxybis (benzenesulfonyl hydrazide) (OBSH; decomposition temperature: about 160° C.), dinitropentamethylenetetramine (DPT; decomposition temperature: about 200° C.), p-toluenesulfonyl hydrazide (TSH; decomposition temperature: about 110° C.), benzenesulfonyl hydrazide (BSH; decomposition temperature: about 95° C.), and the like.

The present invention can be advantageously applied especially to blowing agent powders having a decomposition temperature of 100° C. or higher. Particularly, much merit is brought about when the present invention is applied to ADCA, in which solidification has conventionally been a serious problem.

The blowing agent in the present invention is preferably in the form of a powder. Although the particle diameter thereof is not particularly limited, it is generally about 1 to 50 $\mu$m, preferably about 3 to 30 $\mu$m. The term "particle diameter" as used herein means the median size determined with a laser diffraction particle diameter distribution analyzer.

The term "substantially anhydrous" as used herein means to have a water content lower than 0.03% by weight, preferably lower than 0.010% by weight. The water content (% by weight) in crystalline ADCA is herein determined by heating the crystalline ADCA at 110° C. for 2 hours while passing water-free nitrogen gas therethrough, introducing the effluent nitrogen gas into a Karl Fisher's water meter (trade name: MKS-1; manufactured by Kyoto Electronics Manufacturing Co., Ltd.) prevented from suffering water penetration thereinto from the surrounding air to measure the amount of water contained in the nitrogen gas, and converting this water amount into a percentage amount based on the weight of the crystalline ADCA.

The surface-treating agent which can be used in the present invention is one capable of removing water from a blowing agent Examples include compounds having the property of chemically reacting with water and compounds having the property of adsorbing or holding water. Specific examples include coupling agents, organic acid anhydrides, anhydrous inorganic compounds, desiccants, and the like.

Examples of the coupling agents include silane coupling agents, aluminum coupling agents, titanate coupling agents, and the like.

Examples of the silane coupling agents include conventionally known silane coupling agents. Specific examples include methyltrimethoxysilane, γ-aminopropyl-triethoxysilane, N- (β-aminoethyl) -γ-aminopropyl-trimethoxysilane, N-phenylaminomethyltrimethoxysilane, vinylmethyldiethoxysilane, and the like.

Examples of the aluminum coupling agents include conventionally known aluminum coupling agents. Specific examples include aluminum isopropylate, aluminum ethylate, aluminum tris(ethylacetoacetate), ethylacetoacetatoaluminum diisopropylate, and the like.

Examples of the titanate coupling agents include conventionally known titanate coupling agents. Specific examples include isopropyl triisostearoyl titanate, isopropyl tris (dioctyl pyrophosphate) titanate, tetraoctyl bis(ditridecyl phosphite) titanate, bis(dioctyl pyrophosphate) hydroxyacetate titanate, and the like.

These coupling agents can be used alone or as a mixture of two or more thereof. Among these, preferred are aluminum coupling agents, particularly, aluminum tris (ethylacetoacetate).

Examples of the organic acid anhydrides include conventionally known organic acid anhydrides. Specific examples include phthalic anhydride, succinic anhydride, glutaric anhydride, benzoic anhydride, trimellitic anhydride, and the like these compounds bond to and remove water in a blowing agent, for example, by the following mechanism:

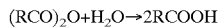

$$(RCO)_2O + H_2O \rightarrow 2RCOOH$$

(wherein R represents an organic acid residue).

The above coupling agents and the organic acid anhydrides can be especially preferred because they not only have the property of chemically reacting with water to thereby remove the water contained in a blowing agent, but also have the property of forming a film capable of preventing external water absorption on the surface of the blowing agent (for example, unreacted coupling agent, and the like).

Examples of the anhydrous inorganic compounds include known anhydrous inorganic compounds so long as they can remove crystal water by binding to water. Specific examples include anhydrous magnesium sulfate, anhydrous potassium carbonate, anhydrous sodium carbonate, anhydrous sodium sulfate, anhydrous sodium sulfite, anhydrous magnesium carbonate, and the like. These compounds adsorb water contained in a blowing agent and fix the adsorbed water as crystal water, for example, by the following typical mechanism:

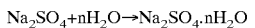

$$Na_2SO_4 + nH_2O \rightarrow Na_2SO_4 \cdot nH_2O$$

(wherein n represents an integer of 1 or more).

Examples of desiccants include conventionally known desiccants so long as they have the property of removing water. Specific examples include acid clay, silica gel, magnesium oxide, calcium oxide, and the like.

In the present invention, the coupling agents, the organic acid anhydrides, the anhydrous inorganic compounds, and the desiccants may be used alone or as a mixture of two or more thereof as the surface-treating agent.

Upon application to the surface of a blowing agent and-preferably heating, the surface-treating agent efficiently reacts with or adsorbs water contained in the blowing agent to thereby reduce the water content of the blowing agent.

The surface-treating agent is preferably used as it is without being dissolved in a solvent, preferably under conditions substantially free of a solvent, in order that no adverse influence be exerted on reaction with water or adsorption of water. If a solution or dispersion of an coupling agent in a solvent is used, the reaction between the water present in the blowing agent and the coupling agent does not proceed sufficiently, water is remained in the blowing agent, and therefore, a substantially anhydrous blowing agent cannot be obtained. Consequently, such use is not preferred under the mixing conditions where pulverization of a blowing agent is inhibited. Especially, use of an organic solvent containing water or moisture is not preferred because a water content in the blowing agent may be increased to the contrary.

The term "under conditions substantially free of water" as used herein means that no solvent is used or that an organic solvent containing a water content of less than 0.1% by weight is used in an amount equal to or less than the amount of the surface-treating agent. In the case of using a solid surface-treating agent, it is preferably used in the form of a fine powder or after being melted.

The amount of the surface-treating agent per the blowing agent varies depending on the amount necessary for allowing the surface-treating agent to react with the water content contained in the blowing agent. Specifically, the surface-treating agent is generally used in an amount of 0.01 to 10 parts by weight, preferably 0.05 to 0.5 parts by weight, based on 100 parts of the blowing agent.

In the present invention, heating treatment is preferably conducted during or after the addition of a surface-treating agent to a blowing agent to thereby accelerate the reaction between the water in the blowing agent and the surface-treating agent. In the present invention, the heating treatment conducted during or after the treatment of a blowing agent with a surface-treating agent is particularly referred to as "treating and heating".

It is effective that the heating is carried out during the addition of a surface-treating agent to a blowing agent.

In the case of using a surface-treating agent which is solid at ordinary temperature, the surface-treating agent is preferably subjected to preheating treatment-prior to the addition thereof to a blowing agent so that the solid surface-treating agent is brought into a melted state.

For example, the heating temperature is generally from 30° C. to the decomposition temperature of the blowing agent, preferably from 40° C. to the decomposition temperature of the blowing agent. If ADCA, OBSH, DPT or the like having a decomposition temperature of 150° C. or higher is used as a blowing agent, the preferred temperature is 55 to 100° C. From the standpoint of reducing the heating period to conduct the mixing even more efficiently to thereby minimize the energy cost, it is preferred to use a heating temperature of about 70 to 90° C.

Methods for adding a surface-treating agent to a blowing agent are not particularly limited. However, a preferred method is to spray the surface-treating agent with a pressure nozzle, a two-fluid nozzle, or the like so as to add the surface-treating agent in the form of fine droplets.

Also, preferably, the addition is carried out while sufficiently mixing a blowing agent.

Mixing apparatuses which can be used for the above mixing are not particularly limited. Examples include a supermixer, a Henschel mixer, a screw mixer such as a Nauta mixer, a proshear mixer, and a ribbon blender.

If a blowing agent which has been made substantially anhydrous is pulverized, the resultant powder has an increased specific surface area and hence enhanced hygroscopicity. Additionally, even if the blowing agent powder which has been coated to inhibit moisture adsorption is used, a section having no coating is provided, and hence hygroscopicity is increased more and more. Thus., the effect of the present invention may be lost. Particularly, if the blowing agent powders having a particle diameter of 10 μm or more which are easily pulverized are used, it should be especially paid attention to this point.

Accordingly, in the present invention, preferably, the mixing is conducted under mixing conditions where pulverization of a blowing agent is inhibited. Herein the term "under mixing conditions where pulverization of a blowing agent is inhibited" means that an increase in the specific surface area through the treatment is 20% or less, more preferably 10% or less. Preferably, as mixers satisfying the conditions, mixers used for blowing agent powders having a particle diameter of about 10 to 300 μm include a Nauta mixer, a proshear mixer (the chopper blades are removed before use), and the like. Furthermore, mixers used for blowing agent powders having a particle diameter of about 3 to 10 μm which are comparatively difficult to be pulverized include a universal mixer, a proshear mixer (the chopper blades are removed before use), and the like. Mixers used for blowing agent powders having a particle diameter of about 3 to 5 μm which are difficult to be pulverized include a supermixer, a Henschel mixer, and the like. The mixing conditions where pulverization of the blowing agent is inhibited can be provided by adjusting the rotary number of each mixer appropriately.

In using a liquid surface-treating agent, it is preferred to use a pressure nozzle, a two-fluid nozzle, or the like, to spray the surface-treating agent in the form of fine droplets over a blowing agent. By spraying a surface-treating agent as fine droplets over a blowing agent, the blowing agent according to the present invention can be obtained with a small amount of the surface-treating agent.

The substantially anhydrous blowing agent of the present invention can be advantageously used as a blowing agent for various synthetic resins in the same manner as conventional blowing agents.

Furthermore, the substantially anhydrous blowing agent of the present invention can be used as a blowing agent composition comprising the crystalline powder and one or more ingredients known in this field, such as a stabilizer, a pigment/filler, a blowing inhibitor, and the like. Examples of the stabilizer include tribasic lead sulfate, dibasic phosphites, lead stearate, zinc stearate, zinc carbonate, zinc oxide, barium stearate, aluminum stearate, calcium stearate, dibutyltin maleate, urea, and the like. Examples of the pigment/filler include chrome yellow, carbon black, titanium dioxide, calcium carbonate, and the like. Examples of the blowing inhibitor include maleic acid.

For easily understanding the present invention, a blowing agent according to the present invention obtained using ADCA as a blowing agent and aluminum tris (ethylacetoacetate) as a surface-treating agent will be explained below with respect to the effects thereof which the present inventors have ascertained. However, the following explanation should not be construed as limiting the scope of the invention in any way.

Powders of blowing agents, for example, ADCA, are usually composed of microscopically porous particles, in each of which water is present on the surface thereof and in the pores and inner parts thereof. When such a powder of ADCA is treated with aluminum tris(ethylacetoacetate), it is considered that the aluminum tris (ethylacetoacetate) reacts with the water present on the surface and in the pores of the ADCA to decompose into aluminum hydroxide and ethyl acetoacetate, and an aluminum hydroxide film is coated on the surface of the ADCA. If the reaction is carried out at a temperature as low as room temperature, a long time is required for the reaction. However, if it is heated to about 80° C., the reaction is accelerated and completed shortly.

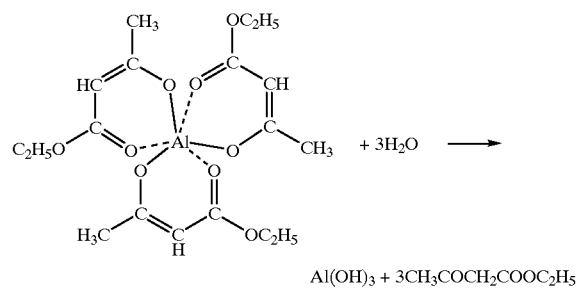

$Al(OH)_3 + 3CH_3COCH_2COOC_2H_5$

It is considered that not only water is removed from the surface and pores of the powders by the above treatment, but also the water remaining in the powders in a slight amount is inhibited from migrating to the powder surface by the film of aluminum hydroxide formed, whereby solidification is prevented. The aluminum coupling agent remaining unreacted is considered to contribute to solidification prevention due to its water repellency. If the powder is further contacted with external water, the above reaction proceeds gradually and water is removed so that solidification is prevented.

EXAMPLES

The present invention will be explained below in more detail by reference to Examples and Comparative Examples. Hereinafter, all percents are by weight, unless otherwise indicated.

ADCA used in the following Examples was one manufactured by Otsuka Chemical Co., Ltd. and having an average particle diameter of 20 μm.

Example 1

Twenty-five kg of ADCA placed in a cone ribbon blender (trade name: Ribocone E RME-50; manufactured by Okawara Mfg. Co., Ltd.) was stirred at 70 rpm and 90° C. for 10 minutes, while adding thereto, by spraying, 50 g of aluminum tris(ethylacetoacetate) (trade name: ALCH-TR; manufactured by Kawaken Fine Chemicals Co., Ltd.) which had been melted by heating at 90° C. Thereafter, stirring was further continued under the same conditions for 7.5 minutes to obtain a blowing agent powder (crystalline ADCA) according to the present invention.

Example 2

Twenty-five kg of ADCA placed in a cone ribbon blender (trade name: Ribocone E RME-50; manufactured by Okawara Mfg. Co., Ltd.) was stirred at 70 rpm and 90° C. for 10 minutes, while adding thereto 50 g of N-(β-aminoethyl) -γ-aminopropyltrimethoxysilane (trade name: TSL8340; manufactured by Toshiba Silicone Co., Ltd.) by spraying at 90° C. Thereafter, stirring was further continued under the same conditions for 7.5 minutes to obtain a blowing agent powder (crystalline ADCA) according to the present invention.

Example 3

Twenty-five kg of ADCA placed in a cone ribbon blender (trade name: Ribocone E RME-50; manufactured by Okawara Mfg. Co., Ltd.) was stirred at 70 rpm and 90° C. for 10 minutes, while adding thereto 50 g of glutaric anhydride by spraying at 80° C. Thereafter, stirring was further continued under the same conditions for 7.5 minutes to obtain a blowing agent powder (crystalline ADCA) according to the present invention.

Comparative Example 1

Twenty-five kg of ADCA was mixed with a solution of 50 g of N-(β-aminomethyl)-γ-aminopropyltrimethoxy-silane (trade name: TSL8340; manufactured by Toshiba Silicone Co., Ltd.) in 1 kg of water by means of Supermixer (trade name; manufactured by Kawada Seisakusho K.K.) at 600 rpm and room temperature for 10 minutes. Thereafter, stirring was further continued for drying under the same conditions for 7.5 minutes to obtain a blowing agent powder of Comparative Example 1.

Comparative Example 2

Untreated ADCA was taken as a bowing agent powder of Comparative Example 2.

Test Example 1

Each of the blowing agent powders obtained in the Examples and Comparative Examples given above was subjected to a measurement of water content (content of residual water), a solidification test in stacking, and a solidification test in practical package. The results obtained are shown in Table 1.

(1) Measurement of Water Content:

Ten g of a sample was precisely weighed out and placed in a flask. The sample was heated at 110° C., for 2 hours while passing water-free nitrogen gas through the flask. During this heating, the effluent nitrogen gas from the flask was introduced into a Karl Fisher's water meter prevented from suffering water penetration thereinto from the surrounding air (trade name: MKS-1; manufactured by Kyoto Electronics Manufacturing Co., Ltd.) to measure an amount of the water (g) contained in the nitrogen gas.

The water content of the sample was calculated using the following equation:

Water content (%)=(Amount of the water/Amount of the weighed sample)×100

(2) Solidification Test in Stacking:

Polyethylene bags each having dimensions of 23 cm by 13 cm were respectively packed with 400 g of a sample. After sufficient deaeration, the opening of each bag was heat-sealed. The packages thus obtained were stacked, and a load of 0.08 kg/cm$^2$ was imposed on the stack. After 10 days, the sample was taken out and screened with a 14-mesh sieve to measure the amount of the sample screened out. This amount was converted to %, which was taken as the value of solidification in stacking.

(3) Solidification Test in Practical Package:

A 25 kg portion of a sample was packed into a corrugated fiberboard case for use as a product packaging container for distribution. This package was allowed to stand for 1 month under conditions at a temperature of 40° C. and a humidity of 80%. Thereafter, the sample was screened with a 14-mesh sieve to measure the amount of the sample screened out. This amount was converted to %, which was taken as the value of solidification in practical package.

TABLE 1

|  | Water content (%) | Solidification degree in stacking (%) | Solidification degree in practical package (%) |
| --- | --- | --- | --- |
| Example 1 | <0.005 | 2.3 | 1.3 |
| Example 2 | <0.005 | 3.0 | 2.5 |
| Example 3 | 0.010 | 9.8 | 5.0 |
| Comparative Example 1 | 0.041 | 5.2 | 12.4 |
| Comparative Example 2 | 0.075 | 56.4 | 41.6 |

A comparison between the test results for the crystalline ADCA's of Examples 1 and 2 and those for the crystalline ADCA of Comparative Example 2 shows that the anhydrous crystalline ADCA according to the present invention were markedly more inhibited from solidification than the untreated blowing agent powder.

A comparison between the test results for the blowing agent powder of Example 2 and those for the blowing agent powder of Comparative Example 1 shows that the surface treatment with a silane coupling agent also yielded a crystalline powder of anhydrous ADCA having greatly improved unsusceptibility to solidification, as desired in the present invention, when no solvent was used and heating treatment was conducted.

Test Example 2

Each of the crystalline ADCA powders obtained in Examples 1, 2, and 3 and Comparative Example 2 (provided that the crystalline ADCA powders of Examples 1, 2, and 3 used here had been subjected to the solidification test in stacking in Test Example 1) was compounded in an amount of 15 parts by weight with 100 parts by weight of low-density polyethylene (melt index: 2.0) and 0.8 parts by weight of dicumyl peroxide. The resultant compositions each was kneaded with heating at a roll temperature of 110 to 115° C. taken out as a sheet having a thickness of 5 mm, and then heated at 125° C. for 5 minutes while applying a pressure of 120 kg/cm$^2$ thereto to obtain a pressed sheet. The sheets obtained were foamed using a hot-air oven set at 220° C.

The foamed materials thus obtained using the crystalline ADCA's of Examples 1, 2, and 3 and Comparative Example 2, respectively, each had uniform and fine cells. The foamed materials were satisfactory and almost equal to one another in surface smoothness and decomposition rate.

These results show that even the anhydrous crystalline ADCA according to the present invention, which had been allowed to stand under load for a prolonged period of time, were equal in foaming performance to the crystalline ADCA just after production.

INDUSTRIAL APPLICABILITY

The blowing agent thus obtained is significantly inhibited from solidification and is exceedingly useful as a blowing agent satisfactory in flowability, dispersibility into resins, and the like, even after the lapse of a prolonged period of time. They are useful in the same field as blowing agents which have conventionally been utilized extensively as blowing agents for thermoplastic resins, for example, vinyl chloride resins, polyolefin resins (e.g., polyethylene resins, polypropylene resins, and the like), ethylene vinyl alcohol resins, rubbers, and the like.

What is claimed is:

1. A process for producing a substantially anhydrous blowing agent powder, comprising the steps of:

treating a blowing agent powder comprising at least one selected from the group consisting of azodicarbonamide, p,p'-oxybis(benzenesulfonyl hydrazide), dinitropentamethylenetetramine, p-toluenesulfonyl hydrazide and benzenesulfonyl hydrazide with a surface-treating agent capable of removing water from the blowing agent powder under conditions substantially free of a solvent, and carrying out a heating treatment at a temperature of 30° C. to the decomposition temperature of the blowing agent powder during or after the treatment with the surface-treating agent to provide a substantially anhydrous blowing agent powder.

2. The process according to claim 1, wherein the heating treatment is carried out at a temperature of 55 to 100 C.

3. The process according to claim 1, wherein the surface-treating agent is subjected to preheating treatment.

4. The process according to claim 1, wherein the treatment of the blowing agent powder with the surface-treating agent is carried out by spraying the surface-treating agent to the blowing agent powder, and mixing them under mixing conditions where pulverization of a blowing agent powder is inhibited.

5. The process according to claim 4, wherein a ribbon blender or a screw mixer is used as a mixer under the mixing conditions where pulverization of a blowing agent powder is inhibited.

6. The process according to claim 1, wherein the blowing agent powder is crystalline azodicarbonamide.

7. The process according to claim 1; wherein the surface-treating agent is at least one selected from the group consisting of a coupling agent, an organic acid anhydride, an anhydrous inorganic compound, and a desiccant.

8. The process according to claim 7, wherein the surface-treating agent is at least one selected from the group consisting of a silane coupling agent, an aluminum coupling agent, and a titanate coupling agent.

9. The process according to claim 7, wherein the surface-treating agent is selected from the group consisting of aluminum isopropylate, aluminum ethylate, aluminum tris (ethylacetoacetate), and ethylacetoacetato-aluminum diisopropylate.

* * * * *